Feb. 8, 1949. H. A. DAWLEY 2,461,148
FLOATING CALIPER GAUGE
Filed April 22, 1947 2 Sheets-Sheet 1
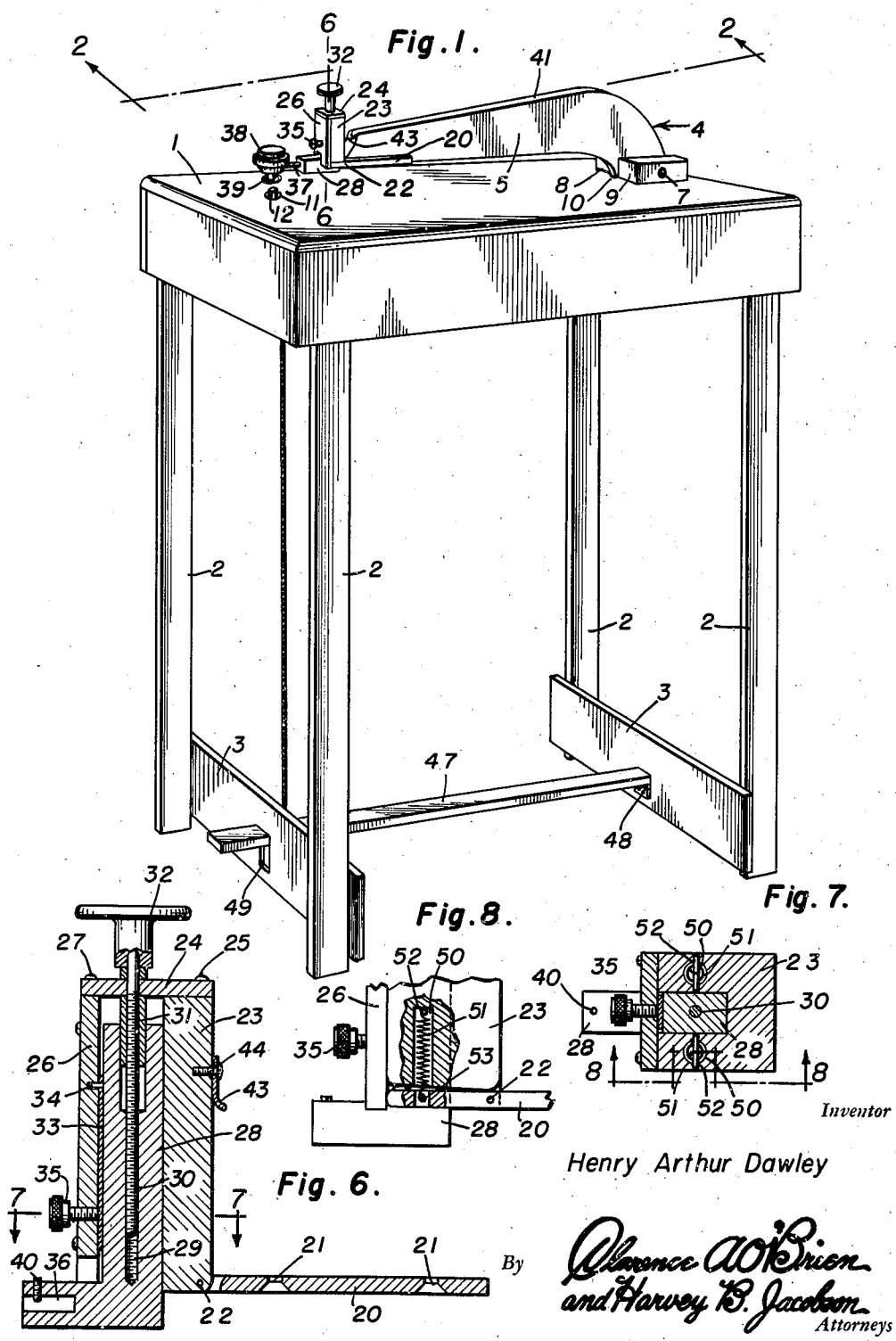
Inventor
Henry Arthur Dawley Feb. 8, 1949. H. A. DAWLEY 2,461,148
FLOATING CALIPER GAUGE
Filed April 22, 1947 2 Sheets-Sheet 2
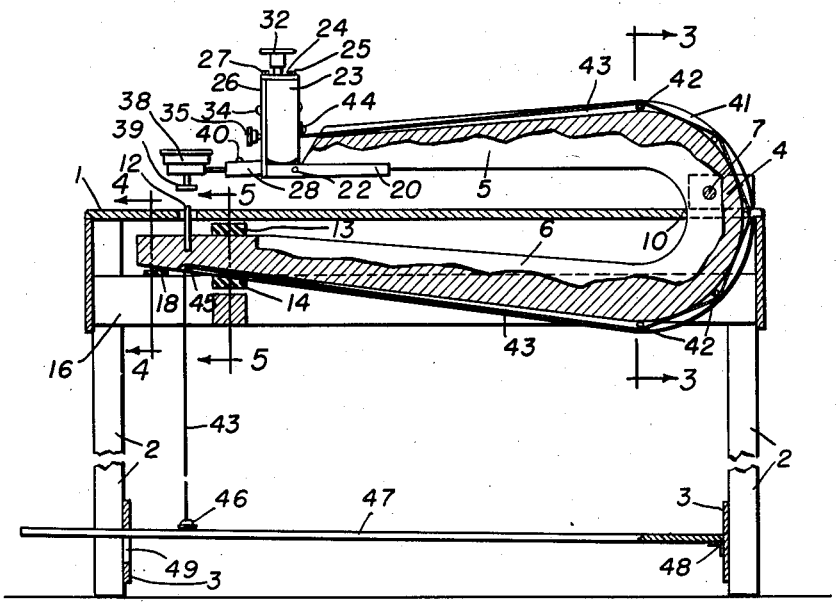
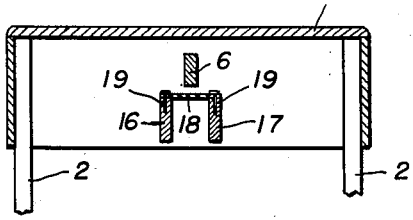
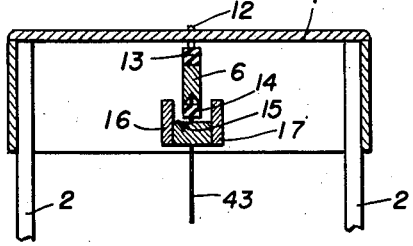
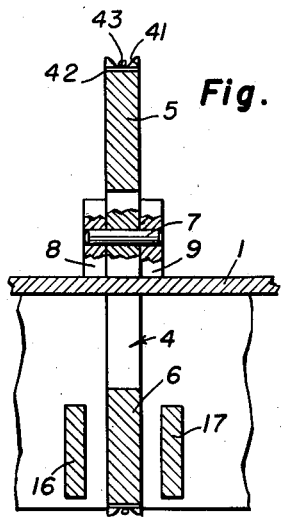
Inventor
Henry Arthur Dawley Patented Feb. 8, 1949

2,461,148

UNITED STATES PATENT OFFICE 2,461,148

FLOATING CALIPER GAUGE

Henry Arthur Dawley, Kansas City, Mo.

Application April 22, 1947, Serial No. 743,038

7 Claims. (Cl. 33—147)

This invention relates to improvements in floating caliper gages.

An object of the invention is to provide an improved caliper gage having oppositely disposed floating gage pins which may be manually separated while placing an object to be gaged therebetween.

Another object of the invention is to provide an improved floating caliper gage having oppositely disposed floating gage pins which may be manually separated while placing an object to be gaged therebetween, and resilient means for automatically moving said gage pins into engagement with the opposite surfaces of said object after the same has been placed in position to be gaged.

A further object of the invention is to provide an improved floating caliper gage including a work supporting table having a U-shape caliper gage supporting bracket member pivotally supported thereon, with a dial indicator and upper gage pin adjustably supported upon the end of the upper arm of said bracket member, and a lower gage pin supported upon the end of the lower arm of said bracket adapted to be vertically movable through an opening in said work supporting table, being opposed to said upper gage pin, and a treadle operated cable being connected with said dial indicator and upper gage pin for pivoting the same upwardly on its supporting arm while simultaneously depressing the lower gage pin below the upper surface of said work supporting table while inserting the work to be gaged between said floating gage pins.

A still further object of the invention is to provide an improved floating caliper gage which will be highly efficient in operation, and relatively inexpensive to manufacture and produce.

Other objects will appear as the description proceeds.

In the accompanying drawings which form a part of this application,

Figure 1 is a perspective view of the improved floating caliper gage;

Figure 2 is a vertical sectional view through a portion of the improved floating caliper gage;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2;

Figure 6 is a vertical sectional view taken on the line 6—6 of Figure 1;

Figure 7 is a sectional view taken on the line 7—7 of Figure 6, and

Figure 8 is a sectional view taken on the line 8—8 of Figure 7.

Like characters of reference are used throughout the following specification and the accompanying drawings to designate corresponding parts.

In carrying out the invention, there is provided a work supporting table having a flat top surface 1 and supporting legs 2 with cross bracing strips 3 adjacent the bottom ends thereof.

A U-shape caliper gage supporting bracket member generally designated by the reference numeral 4 having an upper arm 5 and a slightly longer lower arm 6 is pivotally supported upon the pivot pin 7 disposed between the spaced upwardly extending parallel supporting ears 8 and 9 on the rear end of the table top 1, with said bracket member 4 extending through an opening 10 in the table top 1 between said ears 8 and 9.

An opening 11 is formed through the front end of the table top 1 to permit the lower vertically extending gage pin 12 to freely move therethrough when said bracket member 4 is rocked up and down on its pivot pin 7. The lower gage pin 12 will be supported in the upper edge of the lower arm 6 of the bracket member 4 adjacent its forward end, while rubber cushioning blocks or pads 13 and 14 will be secured respectively to the upper and lower edges of said lower bracket arm 6 for limiting its upward and downward movement, said blocks or pads 13 and 14 being adapted to engage the under surface of the table top 1, and the U-shape guide 15 disposed below said arm, as clearly illustrated in Figures 2 and 5 of the drawings.

A pair of longitudinally extending spaced bracing strips 16 and 17 are secured beneath the table top 1 to extend the full length of said table, and support the transversely extending section of rubber band 18 attached to the upper edges of said strips 16 and 17 by means of the nails or fasteners 19. The rubber band 18 is disposed below and in contact with the under surface of the lower arm 6 at its outer end, and is provided for normally and resiliently supporting the lower gage end 12 which extends through the opening 11 in the table top 1 to a point slightly above the level of said table top.

An attaching bracket arm 20 is formed with spaced openings 21 to receive securing fasteners (not shown) and is adapted to be secured to the lower edge of the upper bracket arm 5 at its outer or forward end, and supports a pivot pin 22 upon which the channeled adjusting head block 23 is pivotally supported.

A cap plate 24 is secured to the top of the head block by means of the screws 25, and supports the depending front or cover plate 26 by means of the screws 27.

An L-shape caliper gage supporting slide member 28 is disposed within the channel in the head block 23 for vertical adjustment, the same being formed with a threaded bore 29 for receiving the threaded adjusting screw 30 which extends through the fixed nut 31 and through the cap plate 24, terminating in the operating knob or handle 32 disposed upon its upper end.

A shim 33 is secured by the pin 34 in contact with the front surface of the L-shape slide member 28 and a locking set screw 35 is threaded through the front plate 26 for locking the slide member 28 in the desired position.

A substantially horizontal bore 36 is formed in the outer end of the base portion of the L-shape slide member 28 and detachably supports the stem 37 upon which the dial indicating caliper gage 38 is mounted, with the depending upper gage pin 39 supported thereby directly over and in alignment with the lower gage pin 12. A set screw 40 will hold the stem 37 locked in the desired adjusted position within the bore 36.

The outer edge of the U-shape bracket member 4 is provided with or formed with a V-shape channel 41, and is provided with a plurality of transversely extending spaced bearing pins 42 over which an operating cable 43 will freely slide. One end of the cable 43 will be secured by the screw 44 to the head block 23 and will extend about the outer edge of the bracket member 4 over said bearing pins 42 in the V-shape channel 41, and over the bearing pin 45 in the lower edge of the arm 6 directly below the lower gage pin 12, to be connected at its lower extremity by means of a screw 46 to the treadle 47 which is hinged at 48 to one of the lower cross bracing strips 3 for the legs 2 of the table. The outer end of the treadle 47 extends through an aperture 49 in the other cross bracing strip 3 at the forward end of the table.

Vertical spacing bores 50 are formed in the lower end of the caliper gage supporting slide member 28, and receive and support the coil springs 51 which are secured at their upper ends to the pins 52 in the upper ends of said bores 50, and are secured at their lower ends to the pins 53 supported by the bracket arm 20, whereby the head block 23 will be resiliently urged to its lower position after the same has been raised on its pivot pin 22 to insert a block or object to be gaged upon the table top 1 between the gage pins 39 and 12.

In operation, the mechanic operating the floating caliper gage will step upon the treadle 47, which will in turn cause the head block 23 to pivot upwardly on the pivot pin 22, and the lower gage pin 12 to recede or drop below the surface of the table top 1. A gage block of known thickness is then placed upon the table top between the gage pins 39 and 12, and the foot removed from the treadle 47, whereupon the gage pins will move toward each other to contact the opposite side surfaces of the test or gage block of known thickness. The thumb lock screw 35 will be slightly unscrewed, and the operating handle 32 upon the adjusting screw 30 will be rotated to bring the indicator hand on the caliper gage 38 to zero reading, after which the set or locked screw 35 will be again tightened. The gage is then ready to test the thickness of other objects for accuracy such as electrotypes, engravings, type bars, and other objects not related to the printing industry.

The treadle is depressed and while the gage pins 39 and 12 are moved further apart, the object to be tested for thickness is placed on the table top 1 between pins 39 and 12, and the treadle released. The accurate reading of the thickness will be indicated on the caliper gage indicator dial, either a zero reading will be shown which will indicate that the object is of the exact and correct thickness, or a plus or minus reading will be noted if the object is of an incorrect thickness.

From the foregoing description, it will be apparent that there has been devised and provided a highly efficient form of floating caliper gage which will be relatively inexpensive to manufacture and produce and absolutely accurate in operation.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A floating caliper gage including a work supporting table having apertures formed through the opposite ends thereof, a pivoted U-shape caliper gage supporting bracket disposed through one of said apertures with its arms extending above and below said table, a head block pivotally supported on the outer end of said upper arm, a dial indicator caliper gage and upper gage pin supported by said head block, and a lower gage pin supported on the outer end of said lower arm for vertical movement through said other aperture.

2. A floating caliper gage including a work supporting table having apertures formed through the opposite ends thereof, a pivoted U-shaped caliper gage supporting bracket disposed through one of said apertures with its arms extending above and below said table, a head block pivotally supported on the outer end of said upper arm, a caliper gage supporting slide member adjustably supported in said head block, a dial indicator caliper gage and upper gage pin supported on said slide member, and a lower gage pin supported on the outer end of said lower arm for vertical movement through said other aperture.

3. A floating caliper gage including a work supporting table having apertures formed through the opposite ends thereof, a pivoted U-shape caliper gage supporting bracket disposed through one of said apertures with its arms extending above and below said table, a head block pivotally supported on the outer end of said upper arm, a caliper gage supporting slide member adjustably supported in said block, means for variably adjusting said slide member, a dial indicator caliper gage and upper gage pin removably supported on said slide member, a lower gage pin supported on the outer end of said lower arm for vertical movement through said other aperture, and means for simultaneously moving both gage pins away from each other while placing an object therebetween to be gaged.

4. A floating caliper gage including a work supporting table having apertures formed through the opposite ends thereof, a pivoted U-shape caliper gage supporting bracket disposed through one of said apertures with its arms extending above and below said table, a head block pivotally supported on the outer end of said upper arm, a caliper gage supporting slide member adjustably supported in said head block, means for variably adjusting said slide member, a dial indicator caliper gage and a gage pin supported on said slide member, a lower gage pin supported on the outer end of said lower arm for vertical movement through said other aperture, a treadle, and means operated thereby for simultaneously moving both gage pins away from each other while placing an object therebetween to be gaged.

5. A floating caliper gage including a work supporting table having apertures formed through the opposite ends thereof, a pivoted U-shape caliper gage supporting bracket disposed through one of said apertures with its arms extending above and below said table, a head block pivotally supported on the outer end of said upper arm, a caliper gage supporting slide member adjustably supported in said head block, means for variably adjusting said slide member, a dial indicator caliper gage and upper gage pin removably supported on said slide member, a lower gage pin supported on the outer end of said lower arm for vertical movement through the other of said apertures, a treadle, means operated thereby for simultaneously moving both gage pins away from each other while placing an object therebetween to be gaged including a guide channel formed in the outer edge of said U-shape caliper gage supporting bracket, spaced bearing pins disposed transversely of said channel, and an operating cable secured to said pivoted head block being extended over said bearing pins in said channel, and secured at its opposite end to said treadle.

6. The subject matter as claimed in claim 5, and cushioning means for cushioning the movement of said lower arm.

7. The subject matter as claimed in claim 5, cushioning means for cushioning the movement of said lower arm, and resilient means for normally urging said lower gage pin to extend through said other opening and beyond the top of said table.

HENRY ARTHUR DAWLEY.

REFERENCES CITED

The following references are of record in the file of this patent:

UNITED STATES PATENTS

| Number | Name | Date |
|---|---|---|
| 1,325,943 | Howard | Dec. 23, 1919 |
| 2,051,357 | Zenke | Apr. 18, 1936 |

FOREIGN PATENTS

| Number | Country | Date |
|---|---|---|
| 396,817 | Germany | June 11, 1924 |
| 268,792 | Great Britain | July 14, 1927 |